(12) United States Patent
Atherton et al.

(10) Patent No.: US 9,874,424 B1
(45) Date of Patent: Jan. 23, 2018

(54) THREAT-RESISTANT GLASS BLOCK PANEL

(71) Applicant: VITRABLOK, S.R.O., Duchcov (CZ)

(72) Inventors: Peter Rist Atherton, Export, PA (US); Nicholas Theodore Loomis, Pittsburgh, PA (US); Larell Harris, Pittsburgh, PA (US)

(73) Assignee: VITRABLOK, S.R.O. (CZ)

( * ) Notice: Subject to any disclaimer, the term of this patent is extended or adjusted under 35 U.S.C. 154(b) by 0 days.

(21) Appl. No.: 14/919,781

(22) Filed: Oct. 22, 2015

Related U.S. Application Data (63) Continuation of application No. 13/223,108, filed on Aug. 31, 2011, now abandoned.

(60) Provisional application No. 61/378,446, filed on Aug. 31, 2010.

(51) Int. Cl.
| | | |
|---|---|---|
| *E04C 1/42* | (2006.01) | |
| *E04H 9/14* | (2006.01) | |
| *B32B 17/06* | (2006.01) | |
| *E04C 2/54* | (2006.01) | |
| *F41H 5/02* | (2006.01) | |
| *E04H 9/04* | (2006.01) | |

(52) U.S. Cl.
CPC .............. *F41H 5/02* (2013.01); *B32B 17/06* (2013.01); *B32B 17/064* (2013.01); *E04C 1/42* (2013.01); *E04C 2/546* (2013.01); *E04H 9/04* (2013.01); *E04H 9/14* (2013.01); *B32B 2307/412* (2013.01); *B32B 2419/00* (2013.01); *B32B 2571/02* (2013.01)

(58) Field of Classification Search
CPC ......... F41H 5/02; B32B 17/064; B32B 17/06; B32B 2571/02; B32B 2419/00; B32B 2307/412; E04C 2/546; E04C 1/42; E04H 9/04; E04H 9/14
See application file for complete search history.

(56) References Cited

U.S. PATENT DOCUMENTS

| | | | |
|---|---|---|---|
| 2,572,580 A | | 10/1951 | Almroth et al. |
| 4,139,973 A | * | 2/1979 | Fujita .................... E06B 3/5409 52/204.591 |
| 4,986,048 A | * | 1/1991 | McMarlin ................ E04B 2/06 52/306 |
| 5,042,210 A | * | 8/1991 | Taylor .................... E04C 2/546 52/307 |
| 5,430,985 A | * | 7/1995 | Coleman .................. E04C 1/42 52/308 |
| 5,448,864 A | * | 9/1995 | Rosamond .............. E04C 2/546 52/307 |
| 5,485,702 A | * | 1/1996 | Sholton .................... E04C 1/42 52/307 |
| 5,845,443 A | * | 12/1998 | Wirkus .................... E04C 1/42 52/308 |
| 5,983,585 A | | 11/1999 | Spakousky |

(Continued)

OTHER PUBLICATIONS

Search Report and Written Opinion for International Application No. PCT/US2011/050051 dated Jan. 25, 2012.

*Primary Examiner* — Brian Glessner
*Assistant Examiner* — Omar Hijaz
(74) *Attorney, Agent, or Firm* — Ostrolenk Faber LLP (57) ABSTRACT

A glass block panel assembled, framed and attached to a substrate such that it resists threats from forced entry, prisoner escape, bullets from guns, bomb blasts, and tornados.

6 Claims, 8 Drawing Sheets

(56) References Cited

U.S. PATENT DOCUMENTS

| | | | |
|---|---|---|---|
| 5,992,111 A * | 11/1999 | Waterhouse | E04C 2/546 52/203 |
| 6,802,162 B1 | 10/2004 | Fisher | |
| 7,413,773 B2 * | 8/2008 | McCoy | E04C 1/42 427/181 |
| 7,877,947 B2 * | 2/2011 | Borressen | E04C 1/42 52/306 |
| 8,657,980 B2 * | 2/2014 | Piroli | E04C 1/42 156/145 |
| 2004/0122145 A1 | 6/2004 | Klosowski et al. | |
| 2004/0163759 A1 * | 8/2004 | Wilkinson | B44C 5/0407 156/254 |
| 2004/0177577 A1 * | 9/2004 | Voegele, Jr. | E04C 2/546 52/306 |
| 2005/0055909 A1 | 3/2005 | Lemert | |
| 2006/0037155 A1 * | 2/2006 | Szekely | E01F 1/00 14/69.5 |
| 2008/0063839 A1 | 3/2008 | Fox et al. | |
| 2009/0007510 A1 * | 1/2009 | McCoy | E04C 1/42 52/306 |
| 2009/0255448 A1 | 10/2009 | Loomis et al. | |
| 2010/0139191 A1 * | 6/2010 | Atherton | E04C 2/546 52/306 |

\* cited by examiner

THREAT-RESISTANT GLASS BLOCK PANEL

CROSS-REFERENCE TO RELATED APPLICATIONS

This application is a continuation of, and claims the benefit under 35 U.S.C. §120 of the earlier filing date of, copending U.S. patent application Ser. No. 13/223,108 filed on Aug. 31, 2011, which claims the benefit under 35 U.S.C. §119(e) of the earlier filing date of U.S. Provisional Patent Application No. 61/378,446 filed on Aug. 31, 2010, the contents of which are incorporated herein by reference in their entirety.

BACKGROUND OF THE INVENTION

1. Field of the Invention

The present invention relates to architectural glass block panels and windows ("panels") and methods of making such panels. More particularly, the invention relates to a new level of threat resistance achieved by these panels that far exceeds the current state-of-the-art in glass block systems with novel resistance to threats from forced entry, prisoner escape, fire arms, bomb blasts, and tornados.

2. Background of the Invention

Glass blocks are often employed instead of plate glass or other fenestration materials in the construction of walls and partitions. Aside from the aesthetic advantages that the glass blocks may provide over other glass materials, the glass blocks may be preferable to solid walls because they are transparent and allow light to filter through, thereby permitting viewing through the wall or creating a brighter room or office space.

Historically, most glass block installations are implemented using masonry. For small window applications, mortared panels are prefabricated, but overall size of the installation is limited due to the heavy weight and the potential for mortar to crack during transport and handling of the glass block panels. With the emergence of improved silicone sealants, larger glass block panels are now feasible and frames have been developed for partitions and windows. Such panels are sufficient for basic residential and commercial window applications, but far higher levels of performance are required to meet to the more stringent standards of threat resistance that are being established by government agencies.

To put the threat resistant performance requirements in context, commercial and residential windows require a cyclic air pressure tests that range from 35 pounds per square foot to 60 pounds per square foot. The Federal Emergency Management Administration (FEMA) tornado standards require windows to withstand air pressures of over 300 pounds per square foot. Government and military standards for blast resistance require resistance to pressures ranging from 576 pounds per square foot to over 1700 pounds per square foot. Commercial and residential glass block windows have no requirement for ballistic resistance, but Underwriters Laboratories (UL) has established a standard for jails and other secure buildings that requires the glass block to resist five shots from a 0.44 Magnum or three shots from a 30 caliber or 7.62 mm rifle. This far exceeds the capability of existing residential or commercial glass block panels or windows. Security installations like prisons require various levels of American Society for Testing and Materials (ASTM) standard forced entry (or escape) resistance which may include dozens of hits by hammers, chisels, sledge hammers and battering rams as well as attacks using ripping bars, fire extinguishers and propane torches. Previous state-of-the art glass block panels or windows intended for residential and commercial window applications are not designed for those types of assaults and cannot even begin to resist such challenges.

The present invention addresses these long-standing problems in the industry by disclosing an improved glass block window system that achieves threat resistance much greater than the prior art. Unlike relatively flimsy frames used in residential and commercial windows, the framework provided herein is a very strong and rigid unitized structure made of steel or other rigid material that is designed to resist very large cyclic and impulsive pressure forces as well as powerful localized point impacts. Unlike the traditional hollow glass blocks, the glass blocks used in the threat resistant structure are solid laminated glass blocks (U.S. application Ser. No. 12/732,727, which is hereby incorporated by reference) specially designed to withstand very high impact from both blunt and sharp instruments and projectiles. The sealant used to hold the glass blocks (e.g., modified urethane) is formulated for very high performance flat glass configurations. These characteristics along with other aspects of the present innovative design result in a very high-performance glass block window system possessing a dramatically improved threat resistance.

SUMMARY OF THE INVENTION

The inventive nature of the glass block panel described herein is based on a very strong rigid unitized framework made of steel or other rigid material that can resist the very powerful shock waves, very high air pressure changes, and very strong impacts from blunt and sharp instruments including bullets. The rigidity and strength of the unitized structure disclosed herein enables it to encapsulate each laminated glass block so that each can behave as an independent unit. The performance of each block is largely independent of neighboring blocks, thus, if an individual block unit can withstand the challenge, the whole glass block assembly will as well. This allows the system to be scaled up to fit larger openings and be used in a diversity of circumstances and geometries.

The encapsulated glass block unit of the present invention preferably includes very high-performance laminated glass block (for example, as shown in U.S. application Ser. No. 12/732,727) that is isolated from the unitized frame by a shock-absorbing material such as SANTOPRENE and sealed into place by a very high-performance self-leveling sealant such as modified urethane having appropriate viscosity and other physical chemical properties. To add mechanical strength to secure the block into the cavity, a channel is molded into the side of the glass block into the lamination layer. To add mechanical strength to grip the solid surrounding solid structure, holes are drilled into the material of the solid frame (e.g., steel). While the sealant has excellent adhesion characteristics, the mechanical grip enhancements significantly enhance the overall assembly once the sealant is cured. The shock-absorbing material reduces contact between the solid frame and the glass block and helps absorb the shock forces created by any ballistic, blast, tornado, and forced entry threats.

This is the first known glass block window and panel system that is resistant to threats as described in government standards for ballistic resistance (UL), forced entry (ASTM), forced entry (Department of State), blast (General Services Administration; GSA) and blast (Unified Facilities Criteria (UFC) military), and tornado (FEMA). While there are laminated flat glass systems that resist many of these threats, there is no prior art for glass block panels or windows that are resistant to any one, much less all, of these threats.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF PREFERRED EMBODIMENTS OF THE INVENTION

It is to be understood that the figures and descriptions of the present invention have been simplified to illustrate elements that are relevant for a clear understanding of the invention, while eliminated for purposes of clarity, other elements that may be well known. The detailed description will be provided hereinbelow with reference to the attached drawings.

The glass block assemblies of the present invention possess properties that are capable of satisfying rigorous testing and the building requirements. Specifically, those tests include:

Threats from guns and rifles—UL 752;
Bomb blast threats for military and government buildings—UFC 04-010-01, GSA-TS001;
Tornado threats for commercial and residential buildings—FEMA 361 and 320, ICC/NSSA 500, AAMA 512-11; and
Forced entry threats for embassies, buildings and prisons—SD-STD-01.01, ASTM F1233, ASTM F 1915.

The capability to withstand these threats far exceeds the capabilities disclosed in prior art glass block panels. To accomplish these levels of threat resistance, the invention described herein preferably utilizes several components of a robust panel: unitized solid frame structure, laminated glass blocks, form-fitting shock-absorbing materials, self-leveling high-performance sealant, and high performance anchor bolts.

The glass block panels of the present invention may be implemented using a wide variety of materials. In some presently preferred embodiments, the solid frame structure is fabricated from stainless steel, while the shock-absorbing material that form a border around the glass block may be fabricated from SANTOPRENE. The self-leveling sealant may be a modified urethane. Those of skill in the art will recognize that other materials may be used instead of those presently preferred listed above. For example, the solid frame material may also be fabricated from other metals (e.g., carbon steel, aluminum), composite materials (e.g., glass-reinforced composites), and the like. While depicted in the figures as a square, the solid frame may take any geometry desired to satisfy the specifications of the construction project at hand.

Figure 1:
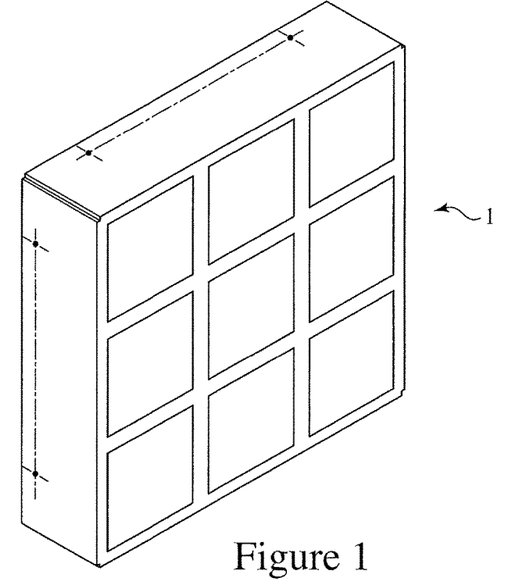
FIG. 1 shows a glass block assembly of the present invention.
Figure 2:
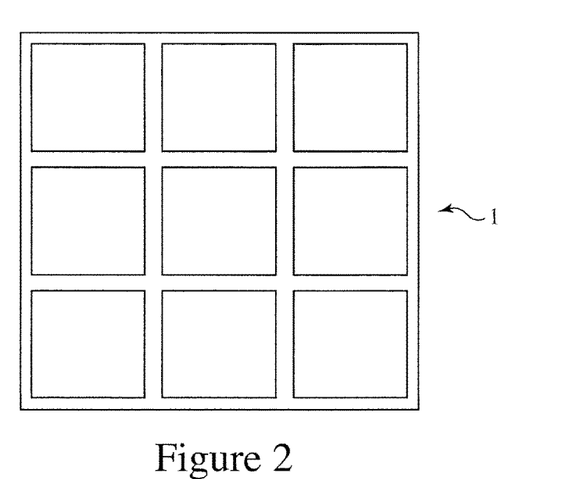
FIG. 2 displays a front view of a glass block assembly of the present invention.
Figure 3:
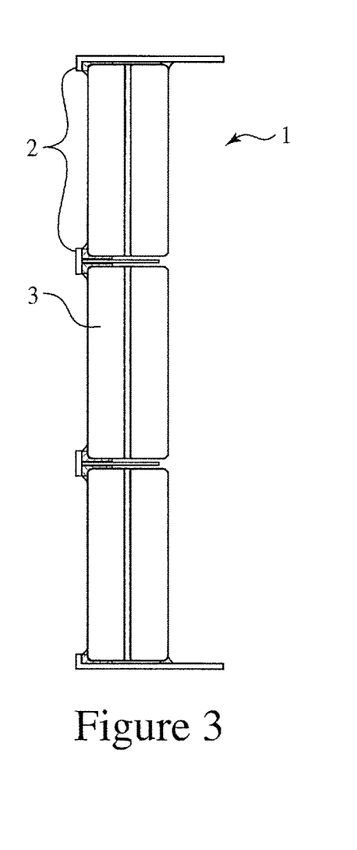
FIG. 3 provides a side view of a glass block assembly of the present invention with the frame attached to the wall opening surfaces of the structure surrounding the glass block assembly.
Figure 4:
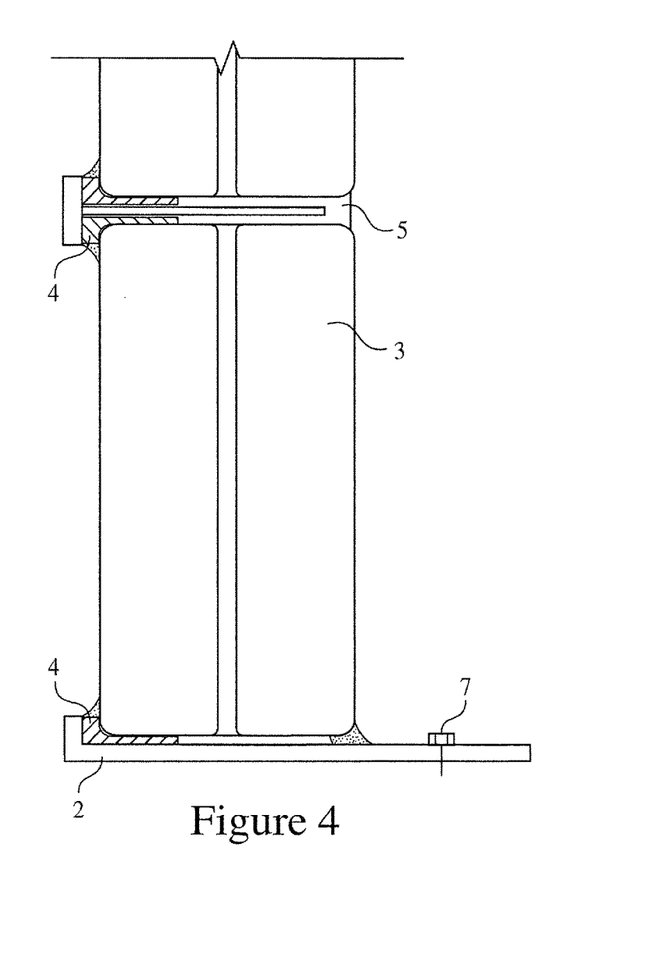
FIG. 4 provides a close-up side view of a glass block assembly of the present invention with the frame attached to the wall opening surfaces of the structure surrounding the glass block assembly.
Figure 5:
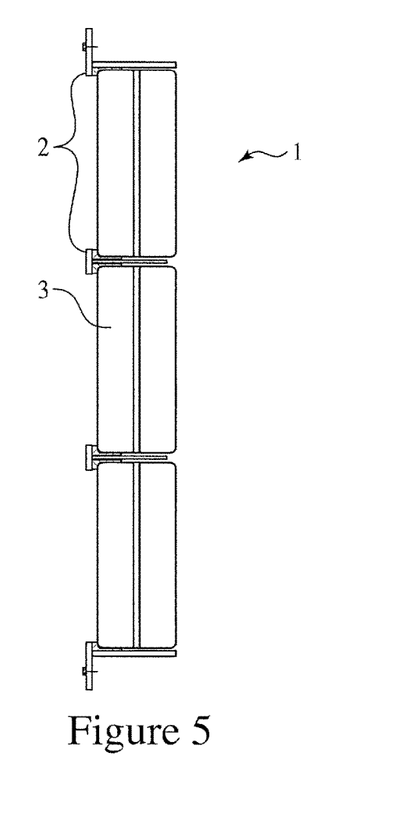
FIG. 5 shows a side view of the glass block assembly of the present invention with the frame attached to the outside wall surfaces of the structure surrounding the glass block assembly.
Figure 6:
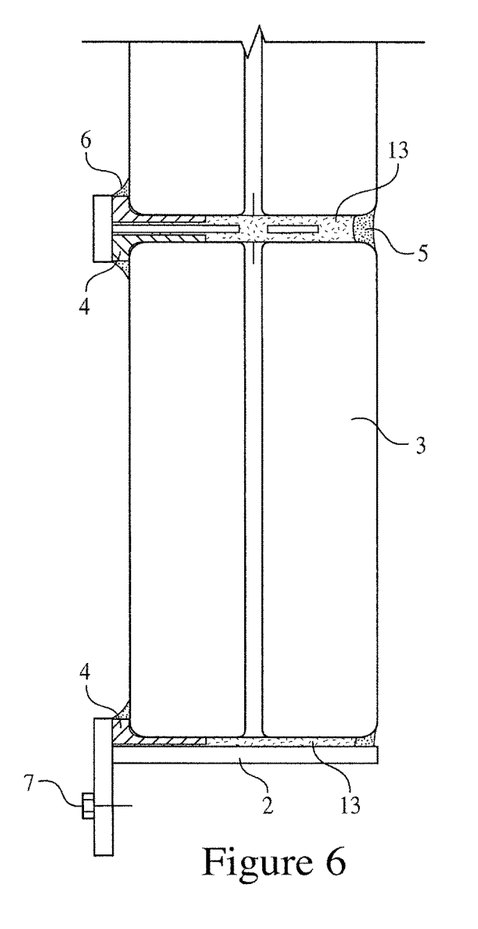
FIG. 6 displays a close-up view of a side view of the glass block assembly of the present invention with the frame attached to the outside wall surfaces of the structure surrounding the glass block assembly.

The drawings in FIG. 1 and FIG. 2 illustrate the assembled threat-resistant glass block panel 1 of the present invention from isometric and plan views. FIG. 3 illustrates a cross-section view and FIG. 4 a close-up view of that cross-section indicating the rigid unitized frame structure 2, the laminated glass block 3, the shock-absorbing border that surrounds the glass block 4, the very tough assembly sealant 5, the edge sealant 6, and the anchor bolt 7 that attaches the window panel to the building opening through the opening side wall. FIGS. 5 and 6 illustrate a similar configuration enabling anchors bolt to attach the panel to the interior or exterior faces of a wall surrounding a window opening.

Figure 7:
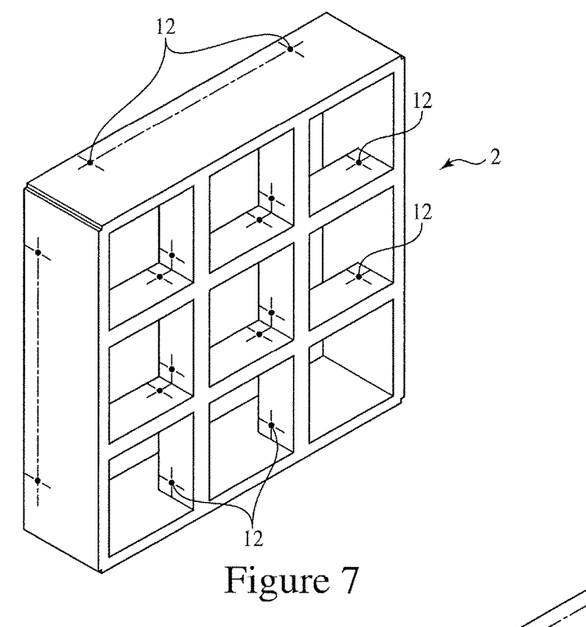
FIG. 7 illustrates the structure that encompasses the glass block assembly of the present invention.
Figure 8:
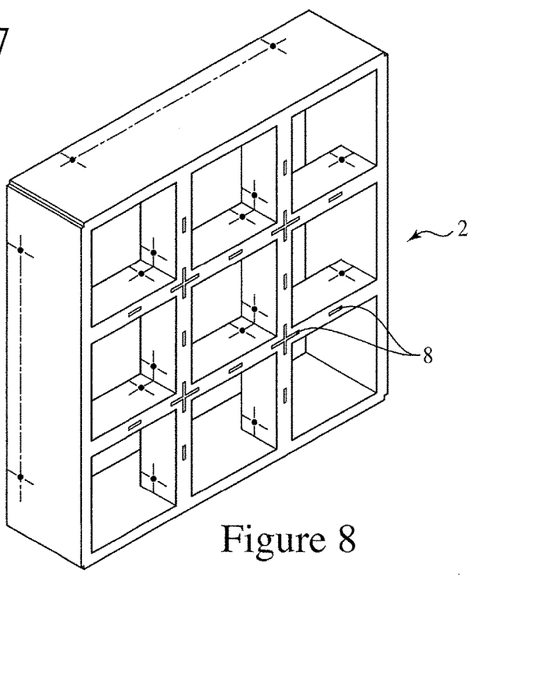
FIG. 8 illustrates the structure that encompasses the glass block assembly of the present invention with the location of tab welds used to unitize the steel structure as described in the preferred embodiment of the present invention.

The rigid unitized structure 2 is illustrated in FIGS. 7 and 8. As described above, manufacturing methods are selected to ensure the rigidity and strength of the structure needed to resist the very powerful threats described. FIG. 7 illustrates one such process referred to as tab welding 8 where a tab from one component is inserted into the slot of another. The tab and slot material is heated to a molten state such that the material (e.g., steel) becomes one unitized component as it cools and hardens. The surface is then ground to a smooth and continuous finish as illustrated in FIG. 8. The preferred embodiment will be fabricated from stainless steel to provide long term durability and aesthetic value.

Figure 9:
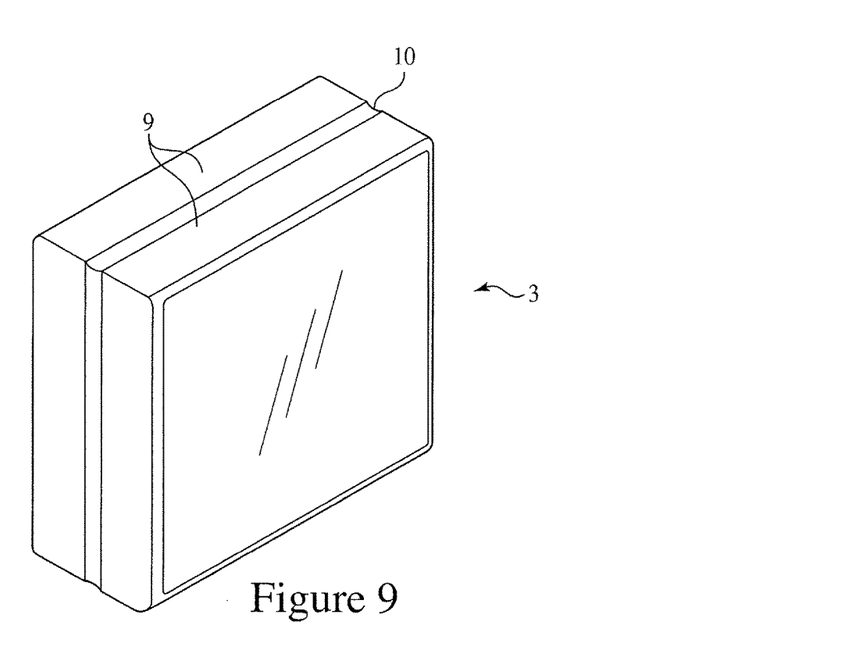
FIG. 9 is a schematic of an exemplary glass block that may be used within the context of the present invention.
Figure 10:
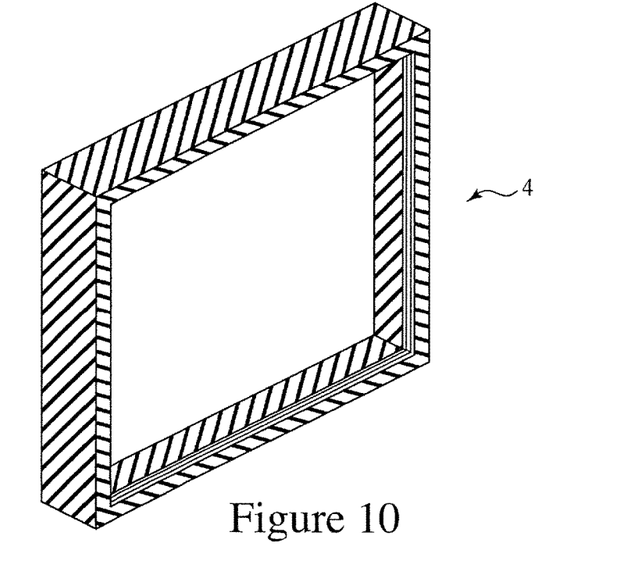
FIG. 10 depicts the shock-absorbing material that may be placed around the glass blocks used within the context of the present invention.

An exemplary laminated glass block 3 of the present invention is illustrated in FIG. 9. As described in patent application Ser. No. 12/732,727, the block preferably includes two solid pieces of annealed glass 9 with a modified laminate (e.g., urethane) 10 therebetween. In addition to adding a very tough material layer between the glass portions of the block, the laminate material may also achieve significant blockade of harmful UV radiation. FIG. 10 illustrates the shock-absorbing border (e.g., rubber or SANTOPRENE) 4 that surrounds the glass block. The shock-absorbing material is specifically designed to provide a custom fit between the laminated glass block and the unitized solid frame structure. The shock-absorbing border may be considered a collar or sleeve into which the glass block is placed. Not only does the shock-absorbing border isolate the glass block from the unitized solid frame, it also allows the glass block to withstand far greater challenges than it would normally be capable of.

Figure 11:
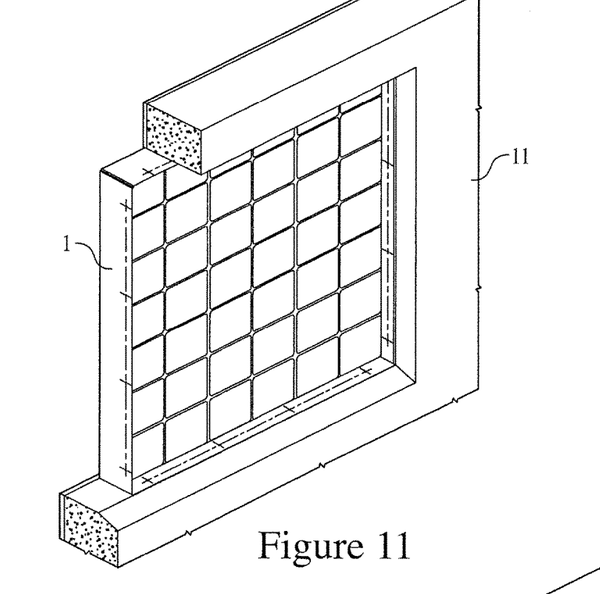
FIG. 11 is a cut-away view of an installed glass block assembly of the present invention as seen from a building interior.
Figure 12:
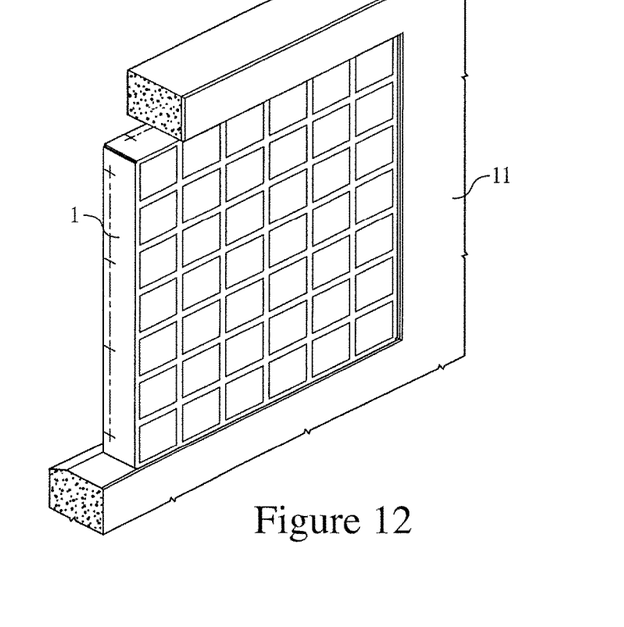
FIG. 12 is another cut-away view of an installed glass block assembly of the present invention as seen from a building exterior.

FIGS. 11 and 12 illustrate interior and exterior cut-away views of the manner in which the threat resistant glass block panel 1 may be installed into a structurally sound concrete wall 11.

In some presently preferred embodiments, the frame structure is a stainless steel. As noted, other metals and solid materials may also be used, such as carbon steel or fiber-reinforced composites. So long as the material possesses properties that allows it to be formed into a rigid and solid frame in which the glass block may reside, it may be effectively used, within the context of the present invention. In some presently preferred embodiments, the frame element that is on the exterior faces of the frame is ¼" thick. The thickness of material that is employed for the unitized frame may be adjusted to accommodate any specifications set by the construction project at hand.

Figure 13:
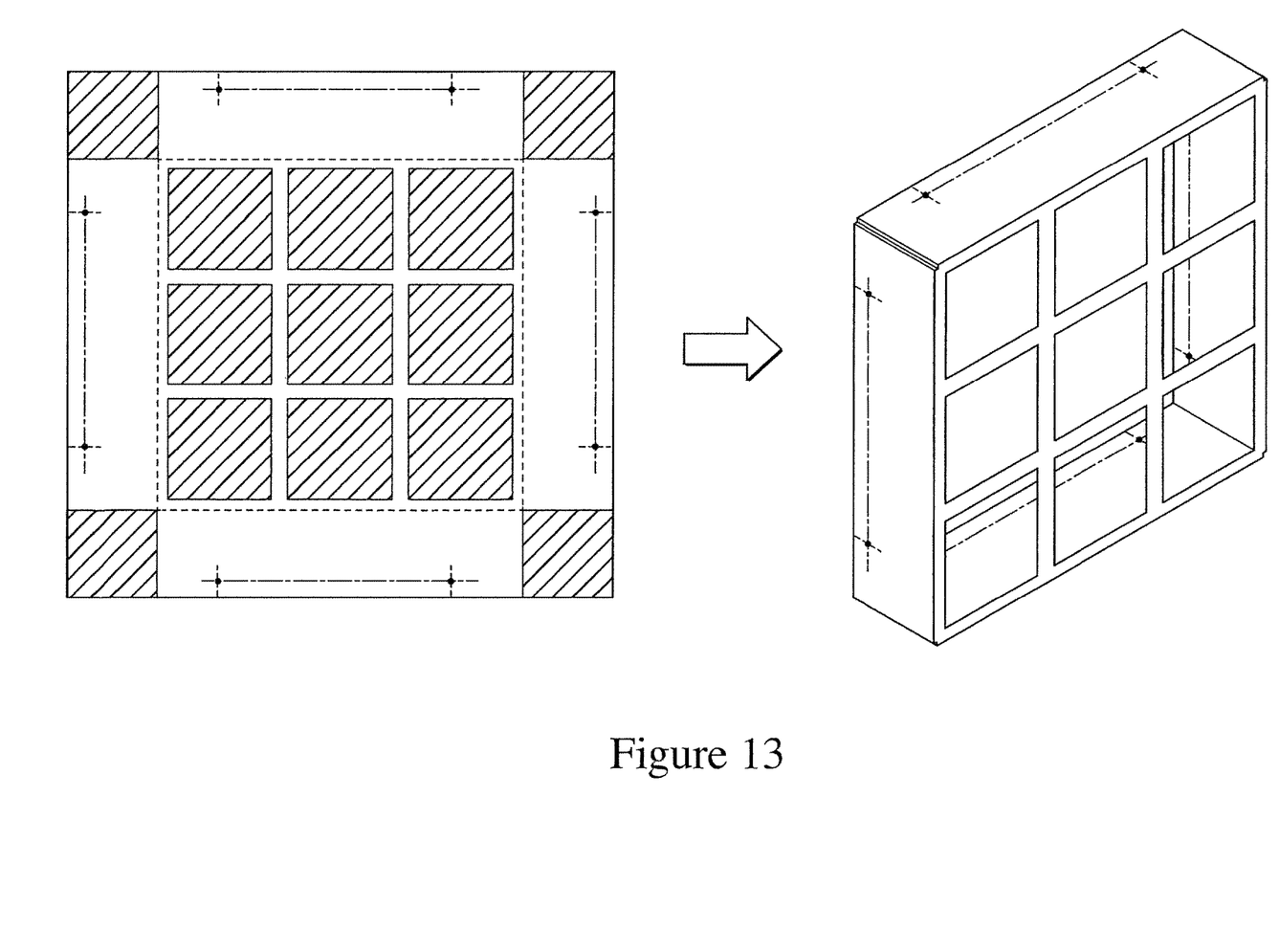
FIG. 13 displays a method of fabricating the unitized frame of the glass block assemblies of the present invention.

In some presently preferred embodiments, fabrication of the individual cells of the frame into which the glass block is to be placed is performed using ¼" plate steel, as show in FIG. 13. As shown, the steel plate is approximately in the form of a "+" where the center of the plus is the approximate size of the glass block assembly and each arm of the plus is approximately 6" in length. The center of the plus will form the outer face of the glass block assembly. Each of the arms is then bent away from the face at 90 degrees to form a box having once face solid (the future outer face of the glass block assembly) and the opposite face open. The box that is formed is sized to accommodate a plurality of shock-absorbing borders and glass block. The corners of the steel that foiins the sides of the box may then be welded or melted to unitize the structure. The outer face of the box is then cut with a laser or water jet cutter to create openings that define the future location of the glass block that are part of the glass block assembly. In alternative methods of the present invention, the openings that define the future location of the glass block may be cut into the face prior to forming the sides of the box from the arms. Interior walls may then be added to the outside frame of the glass block assembly. The interior walls define individual cells into which a shock-absorbing border and a solid glass block will be placed.

In other embodiments, the box that is formed is sized to accommodate a shock-absorbing border and a glass block. The corners of the steel that forms the sides of the box may then be welded or melted to unitize the structure. The outer face of the box are then cut with a laser or water jet cutter to create openings resulting in individual cells able to accommodate the shock-absorbing border and glass block. Multiple cells may be welded or melted together to form the overall structure of the unitized frame used to achieve the performance criteria listed above illustrated in FIG. 7.

Figure 14:
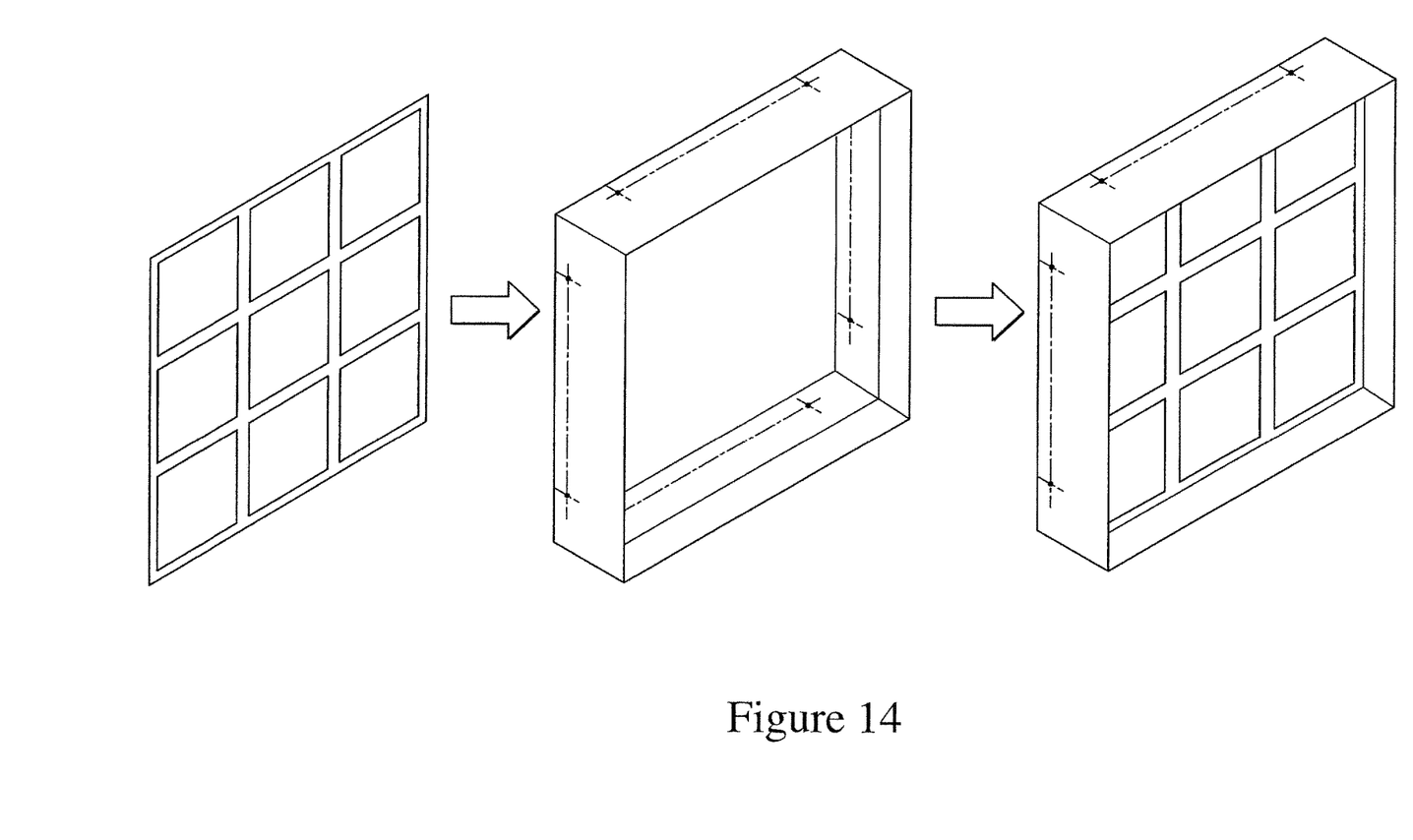
FIG. 14 displays a method of fabricating the unitized frame of the glass block assemblies of the present invention.

In other embodiments of the present invention, a unitized outer frame is constructed sized for the specific opening of the construction project at hand. At this point in the fabrication process, the outer frame is defined only by a vertical wall around the outside of the frame, as shown in FIG. 14. The outer face, which has had openings cut in it cut with a laser or water jet cutter to define the future location of the glass block, may then be welded or melted to the outer frame to form the unitized frame of the glass block assembly of the present invention.

While the present example has been described for 8"-square cells, the geometry of each cell may be altered to accommodate glass block having various geometries as desired or required by the construction project at hand.

The preferred embodiment will utilize a tab welding technique illustrated in FIG. 8. The method involves laser or water jet cutting slots and tabs of adjoining elements, then inserting the tab into the slot and welding the joint. This creates an extremely robust unitized solid frame and lattice structure having interior cavities for receiving the shock-absorbing border and glass block. As noted, the unitized frame may take any geometric configuration that is appropriate for the construction project at hand.

Into each cavity or cell of the lattice structure of the unitized frame a shock-absorbing border is inserted, and a laminated glass block is then inserted into the shock-absorbing border. The shock-absorbing border that is illustrated in FIG. 10 is molded to a geometric shape that will fit snuggly into each lattice compartment and will tightly grip the laminated glass block. In some presently preferred embodiments, the shock-absorbing border is made with SANTOPRENE in order to provide the desired elasticity for ease of assembly, to provide mechanical shock absorbing characteristics for threat resistance, to provide durability in the temperature and UV radiation expected, and to offer the colors options expected to be needed in particular construction implementations.

In a preferred embodiment of the present invention, the laminated glass block is two 8"×8"×1.5" pieces of annealed glass assembled with a very high-performance modified urethane laminate in between. A more encompassing description of laminated glass blocks can be found in U.S. application Ser. No. 12/732,727, which is hereby incorporated by reference. As described therein, the glass block is formed from two solid halves of a glass block are secured together using a laminate. The two halves of the glass block are placed into a containment material prior to introducing the laminate. In this embodiment, the glass is annealed for several hours for strength and resistance to breaking. The laminate may be a liquid modified urethane that fills any gaps between the two pieces of glass. Any laminate that possesses a viscosity and other physical properties that allow it to adhere to glass, shock-absorbing border, and unitized frame may be used. Preferably, the laminate is formulated to grip aggressively to glass and to be extremely durable such that in combination with the glass it will stop a direct hit from a bullet or a large object hurled at tornado-level wind speeds. When used, the modified urethane used in some presently preferred embodiments also preferably has superior properties of almost no shrinkage and blocks over 99% of harmful UV radiation. In some presently preferred embodiments, each glass block includes a groove around its exterior perimeter where the laminate material is exposed as illustrated in FIG. 9. The groove may be formed in the laminate layer as seen in 10 at the time the laminated glass block is fabricated by indenting the containment material (e.g., tape) used to retain the laminate material when it is poured in its liquid state between two halves of the glass block. After the laminate is cured, the containment material will be removed, leaving the groove.

The glass block is inserted into the shock-absorbing border which is in turn inserted into the unitized solid frame. This combination of materials provides a cushion for the glass block to help absorb shock and minimize glass fracturing while containing any threats to the unitized frame structure.

In a preferred embodiment, the unitized frame having the glass blocks and shock-absorbing borders inserted is laid face-down, and a self-leveling sealant 13 is poured in between the blocks to hold the structure together. The self-leveling sealant 13 will flow between the blocks, frame, and shock-absorbing borders to secure them into place. As noted above, the sealant 13 also is able to flow through the holes 12 that have been formed in the unitized frame and the groove in the glass block to stabilize the entire glass block assembly more securely. The preferred self-leveling sealant 13 is the same modified urethane material used to laminate the glass blocks. As a sealant, it possesses the same physical properties as the laminate in that it grips very aggressively to glass and the solid material from which the unitized frame is fabricated. The sealant 13 also preferably is very structurally sound, does not shrink during or after curing, and stands up well to weather and sunlight conditions.

A preferred embodiment also allows the structure to be attached to building substrates approved for threat resistant applications including steel, reinforced concrete, concrete masonry units, and wood. As with any construction project, installation of the glass block assemblies of the present invention will be secured using proper anchor bolts with the appropriate spacing, offset and shim requirements in order to provide the desired threat resistance and geometric configuration.

Ultimately, the glass block assemblies of the present invention allow light and visibility through the structure while protecting inhabitants from major threats to life and injury.

Nothing in the above description is meant to limit the present invention to any specific materials, geometry, or orientation of elements. Many substitutions are contemplated within the scope of the present invention and will be apparent to those skilled in the art. The embodiments described herein were presented by way of example only and should not be used to limit the scope of the invention.

What is claimed is:

1. A glass block assembly, comprising:
    a plurality of laminated glass blocks, wherein each laminated glass block has a laminated glass block depth and comprises two faces, four sides and an exterior perimeter formed around the four sides, wherein each of said plurality of laminated glass blocks comprises two solid halves of a glass block with a laminate layer in between said solid halves, wherein there is a gap between said two solid halves, wherein said laminate layer comprises a liquid modified urethane filling said gap between said two solid halves, wherein each of said plurality of laminated glass blocks includes a groove around the exterior perimeter of the laminated glass block, and wherein the groove is formed in the liquid modified urethane of said laminate layer;
    a unitized frame, wherein said unitized frame has exterior walls that define a perimeter and a depth that is greater than the laminated glass block depth, further wherein said unitized frame includes interior dividers that are spaced to form interior cells wherein said interior dividers are formed from walls of said interior cells, each said interior cell having an interior perimeter that receives a shock-absorbing border into which a respective one of said plurality of laminated glass blocks fits to form a collar surrounding the four sides and contacting one of said two faces thereof;
    a self-leveling sealant surrounding each of said plurality of laminated glass blocks and received in the grooves formed in said laminate layer of the laminated glass blocks; and
    a plurality of flow holes in said walls of said interior cells of said unitized frame; wherein the self-leveling sealant is received into said flow holes to stabilize the unitized frame.

2. The glass block assembly of claim 1 wherein said unitized frame has grooves in said exterior walls and said interior dividers are adapted to receive said self-leveling sealant.

3. The glass block assembly of claim 1, wherein said unitized frame is fabricated from stainless steel.

4. The glass block assembly of claim 1, wherein said shock-absorbing border is fabricated from a rubber-like material.

5. The glass block assembly of claim 4, wherein said rubber-like material is SANTOPRENE.

6. The glass block assembly of claim 1, further comprising anchor bolts, wherein said anchor bolts are adapted to secure said unitized frame to a building substrate.

* * * * *